June 19, 1956
H. E. HERRMAN ET AL
2,751,197
REFRIGERATOR HUMIDIFIER
Filed Jan. 5, 1953
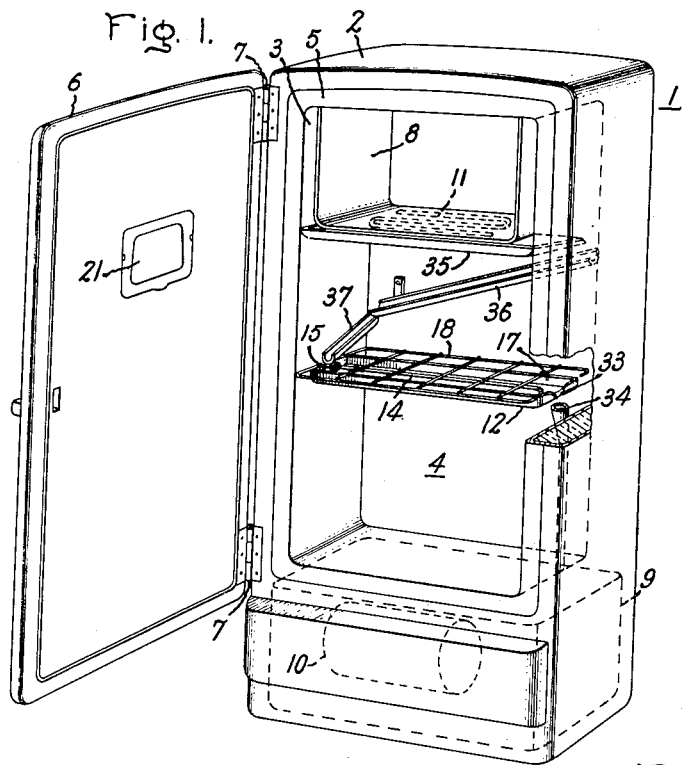
Inventors:
Howard E. Herrman,
Charles S. Grimshaw,
by *[signature]*
Their Attorney.

United States Patent Office 2,751,197
Patented June 19, 1956

2,751,197
REFRIGERATOR HUMIDIFIER

Howard E. Herrman, Stratford, Conn., and Charles S. Grimshaw, Harborcreek Township, Pa., assignors to General Electric Company, a corporation of New York Application January 5, 1953, Serial No. 329,598

2 Claims. (Cl. 257—3)

Our invention relates to refrigerators and pertains more particularly to means for maintaining a satisfactory degree of humidity in the food storage compartments of refrigerators.

The formation of frost on the cooling unit in the food storage compartment of a refrigerator is the result of condensation and freezing of moisture in the air in the food storage compartment. During this process of frost formation the cooling unit tends to maintain in the food storage compartment a dew point near the surface temperature of the cooling unit, resulting in low relative humidity in the food storage compartment. Under conditions of average door openings, however, sufficient moist air is admitted into the food storage compartment for maintaining a high relative humidity therein. Under conditions of infrequent door openings little moist air is admitted into the food storage compartment and the cooling unit succeeds in causing the dew point to approach its surface temperature thereby causing low relative humidity in the food storage compartment. When this condition prevails in the food storage compartment there is a tendency for the natural moisture to be extracted from food items therein, resulting in drying out of such food items. In order to minimize such drying out of food, it is essential that some means be provided for maintaining a satisfactory degree of humidity in the food storage compartment. Accordingly, the primary object of our invention is to provide means for maintaining a satisfactory degree of humidity in the food storage compartment of a refrigerator.

Another object of our invention is to provide means including a receptacle of water for maintaining a satisfactory degree of humidity in the food storage compartment of a refrigerator and void of odor problems.

Another object of our invention is to provide means operative for maintaining a satisfactory degree of humidity in the food storage compartment of a refrigerator in response to the conditions of air in the food storage compartment.

Another object of our invention is to provide means whereby the heat emanating from a refrigerating unit located in the machinery compartment of a refrigerator is utilized in maintaining a satisfactory degree of humidity in the food storage compartment of the refrigerator.

Still another object of our invention is to provide means whereby room heat is employed in maintaining a satisfactory degree of humidity in the food storage compartment of a refrigerator.

Further objects and advantages of our invention will become apparent as the following description proceeds and the features of novelty which characterize our invention will be pointed out with particularity in the claims annexed to and forming part of this specification.

In carrying out the objects of our invention, we provide a receptacle disposed in the food storage compartment of a refrigerator and containing a supply of water for being evaporated. Periodically, the receptacle is refilled to overflowing thereby to replenish the supply of water and to prevent stagnation of water in the receptacle. In one form of our invention the receptacle further contains a heating element adapted for being energized and evaporating the water in the receptacle in response to conditions within the food storage compartment. In another form, the receptacle is rested on the bottom of the food storage compartment just over a machinery compartment housing a refrigerating unit, and heat leakage into the food storage compartment from the refrigerating unit effects evaporation of the water supply. In still another form, a heat path is provided between the receptacle and the outer case of the refrigerator and room heat is thereby utilized for evaporating the water supply.

For a better understanding of our invention, reference may be had to the accompanying drawing in which Fig. 1 is a perspective view of a refrigerator partly broken away to illustrate certain features of the preferred embodiment of our invention;

Fig. 2 is an enlarged fragmentary sectional view illustrating details of the preferred embodiment of our invention;

Fig. 3 is a diagrammatic showing of an arrangement for controlling the heating element;

Fig. 4 is a diagrammatic showing of another arrangement for controlling the heating element;

Fig. 5 is a diagrammatic showing of still another arrangement for controlling the heating element;

Fig. 6 is a side elevation of the refrigerator partly broken away to illustrate a second embodiment of our invention; and Fig. 7 is an enlarged fragmentary sectional view illustrating a third embodiment of our invention.

Referring now to the drawing, there is shown in Fig. 1 a refrigerator generally designated 1. The refrigerator 1 comprises an outer case 2 and a liner 3. The space between the outer case and liner is filled with suitable insulation and the liner 3 defines a food storage compartment 4. Additionally, a heat insulative breaker strip 5 closes a space between the edges of the outer case 2 and the liner 3 at an access opening to the food storage compartment 4. Provided for closing the access opening is a door 6 supported on the outer case 2 by a pair of hinges 7. Arranged in the upper portion of the food storage compartment 4 for cooling the air therein is a cooling unit or evaporator 8. Located beneath the food storage compartment 4 is a machinery compartment shown in outline and generally designated 9. Housed in the machinery compartment 9 and also shown in outline is a refrigerating unit 10 adapted for supplying refrigerant to the cooling unit when energized.

During normal operation of the refrigerator 1, moisture in the air in the food storage compartment 4 tends to condense and freeze on the cooling unit 8. Periodically and automatically defrosting means such as a sheathed heating element, shown in outline in Fig. 1 and designated 11, is effective for heating the cooling unit 8 and thereby melting the frost therefrom. It is to be understood, of course, that means other than the heating element 11 could be utilized for defrosting the cooling unit 8. For instance, the refrigerating system employed in the refrigerator 1 could be of the reverse cycle type and defrosting could be effected by periodically directing warm refrigerant to the cooling unit. Usually the defrost moisture or water resulting from a defrosting operation is conducted directly to a receptacle in the refrigerator or to the exterior of the refrigerator for disposal. However, in a manner which shall be described in detail hereinafter, our invention contemplates employment of the defrost moisture in maintaining a satisfactory degree of humidity in the food storage compartment 4.

Under conditions of average door openings and average humidity in the room containing the refrigerator 1, relatively moist air is admitted into the food storage compartment 4. This moist air causes water to condense in the food storage compartment 4. During periods when the door 6 is closed this water evaporates and recondenses on the cooling unit 8. So long as moist air is admitted into the food storage compartment 4 and so long as the just-mentioned water evaporation and recondensation take place, free moisture exists and, therefore, a high relative humidity is maintained, in the food storage compartment. As a result, the natural moisture of food items in the food storage compartment 4 is not extracted from such food items. Under conditions of infrequent door openings and less than average room humidity, however, the amount of moist air admitted into the food storage compartment 4 is insufficient for maintaining a high relative humidity and, therefore, the food items in the food storage compartment tend to be dried out by extraction of moisture therefrom.

In order to minimize the drying out of food items stored in the food storage compartment 4, we have provided a humidifier for maintaining a degree of humidity in the food storage compartment at which the food items stored in the food storage compartment retain their natural moisture.

The preferred embodiment of our invention is illustrated in Figs. 1 and 2. This form comprises a receptacle or tray 12 containing a supply of moisture or water indicated by 13. The receptacle 12 further contains a sheathed heating element 14. Current is supplied to the heating element 14 through an electrical plug 15 protruding from one side of the receptacle 12 and received by an electrical socket 16 suitably mounted on a side wall of the liner 3. This connection renders the receptacle 12 removable for cleaning and provides support for one end of the receptacle. The other end of the receptacle may be supported by one or more hooks 17 adapted for engaging a rack or shelf 18 suitably supported in the food storage compartment 4.

The heating element 14 is submerged in the water supply 13 and is adapted for being energized and heating the water thereby to effect evaporation of the water to increase the humidity in the food storage compartment 4. In order to provide a satisfactory degree of humidity in the food storage compartment, we provide means for energizing the heating element 14 in response to conditions in the food storage compartment. In Fig. 3 is illustrated a circuit 19 in which the heating element 14 is controlled in response to either the temperature or humidity of air in the food storage compartment 4. A component 20, included in the circuit 19, may be either a thermostat or a humidistat adapted for being located in the food storage compartment 4. Any suitable thermostat or humidistat is employable in this arrangement and since these devices are well known in the art, they are not herein described or shown in detail. When the component 20 of Fig. 3 is a thermostat, the temperature of the air in the food storage compartment 4 controls the heating element 14. With this arrangement, when the temperature of the air in the food storage compartment approaches a predetermined minimum, at which it is likely that substantially all of the moisture in the air in the compartment would be condensed and frozen on the cooling unit 8, the thermostat completes a circuit through the heating element 14. Thus, the supply of water 13 in the receptacle 12 is heated and a portion thereof is evaporated for increasing the humidity in the food storage compartment 4. The thermostat is adapted for deenergizing the heating element 14 when the air in the food storage compartment attains a predetermined maximum. This predetermined maximum is preferably approximately 40° F. since this temperature is usually attained by the air in the food storage compartment through door openings which also admit moisture into the compartment. Thus, electrical current is conserved since a satisfactory degree of humidity is arrived at through door openings and the evaporation of the water supply 13 by energization of the heating element 14 is not required.

When the component 20 of Fig. 3 is a humidistat, the humidity in the food storage compartment 4 controls the heating element 14. In such an arrangement, when the degree of humidity in the food storage compartment 4 approaches a predetermined minimum, the thermostat completes a circuit through the heating element 14. Thus, the supply of water 13 is heated and a portion thereof is evaporated from the receptacle 12 for increasing the humidity in the food storage compartment. Subsequently, when the degree of humidity in the food storage compartment is increased to a predetermined maximum or a satisfactory degree the humidistat deenergizes the heating element 14. It is to be understood, of course, that if the humidity in the compartment stands at or above the satisfactory degree due to door openings, evaporation of water from the receptacle 12 will not be required and the humidistat will prevent energization of the heating element 14.

As seen in Fig. 1, a butter conditioner indicated by 21 is provided in the door 6 of the refrigerator 1. In Fig. 4 is illustrated a circuit 22 whereby both the butter conditioner 21 and the heating element 14 in the receptacle 12 may be controlled. The circuit 22 includes the heating element 14, a thermostat 23 and another heating element 24. The thermostat 23 and the heating element 24 are located in the butter conditioner 21. The butter, or any other food item that may be stored in the butter conditioner 21, is cooled by air entering the butter conditioner from the food storage compartment 4. When the air entering the butter conditioner 21 decreases to a predetermined minimum temperature, the thermostat 23 completes the circuit 22 for energizing the heating element 24. Thus, the air in the butter conditioner 21 is heated for maintaining the butter at a consistency suitable for easy spreading. When the air in the butter conditioner 21 attains the just mentioned predetermined minimum temperature, the air in the food storage compartment 4 will have attained a lower predetermined minimum temperature. This low temperature is usually associated with few door openings. Therefore, there is a tendency for moisture to be extracted from the food items stored in the food storage compartment. Completion of the circuit 22 by the thermostat 23, however, in addition to energizing the heating element 24 to heat the air in the butter conditioner 21, is effective for also energizing the heating element 14 thereby to evaporate same of the water supply 13 for increasing the humidity in the food storage compartment.

Upon subsequent door openings, warm and moist air is admitted into the food storage compartment 4. This air enters the butter conditioner 21 and causes the thermostat 23 to open the circuit 22. Thus, the heating element 24 is deenergized since it is no longer needed for raising the temperature of the air in the butter conditioner 21. Additionally, the heating element 14 is deenergized since, due to the moisture admitted into the food storage compartment 14 by the door openings, it is no longer needed for evaporating the water supply 13.

In Fig. 5 is illustrated another circuit 25 adapted for effecting evaporation of the water supply 13 from the receptacle 12 during infrequent door openings when an increase in the degree of moisture in the food storage compartment 4 is desired and for deenergizing the heating element 14 as door openings increase and moisture is admitted to the food storage compartment. The circuit 25 includes the refrigerating unit 10 and a temperature-responsive control generally designated 26. The control 26 includes a bellows 27, a volatile fluid containing bulb 28 adapted for being placed in heat exchange relationship with the cooling unit 8, a tube 29 connecting the bulb 28 and the bellows 27, and a contact member 30 adapted for being actuated by the bellows 27. The contact member 30 controls a pair of contacts 31 between the refrigerating unit 10 and a source of power. At a predetermined high temperature of the cooling unit 8, as effected by frequent door openings, the volatile fluid in the bulb 28 effects expansion of the bellows 27 whereby the contact element 30 is actuated for closing the contacts 31. Thus, a circuit is completed through the refrigerating unit 10 for energizing the refrigerating unit to supply refrigerant to the cooling unit 8 for decreasing the temperature thereof. The contact member 30 also controls a pair of contacts 32 in a circuit including the heating element 14. When the contacts 31 are closed and the refrigerating unit is energized, the contacts 32 are open and the heating element 14 is deenergized, this being a desirable operation due to the high probability that frequent door openings which cause energization of the refrigerating unit will also admit sufficient moisture into the food storage compartment for maintaining a satisfactory degree of humidity therein. Subsequently, when energization of the refrigerating unit 10 and infrequent door openings cause the cooling unit 8 to attain a predetermined low temperature, the volatile fluid in the bulb 28 effects contraction of the bellows 27 and the contact member 30 opens the contacts 31 and closes the contacts 32, in the manner shown in Fig. 5. Thus, the refrigerating unit 10 is deenergized and the heating element 14 is energized for increasing the humidity in the food storage compartment 4. This is a desirable operation also since that time when the refrigerating unit is deenergized is the time when a low degree of humidity is most likely to be encountered in the food storage compartment. When door openings are more frequent, the refrigerating unit operates a greater portion of the time. Also, humidity in the food storage compartment is likely to be high when door openings are frequent. By our invention this is automatically factored into the control since the heater is energized a smaller portion of the time under these conditions.

In order to avoid odor problems, we have provided means for preventing stagnation of water in the receptacle 12. This we accomplish by periodically refilling the receptacle 12 to overflowing whereby matter at the surface of the supply of water 13, which usually causes odors, is periodically washed from the receptacle. To facilitate this periodic overflowing of the receptacle 12 and disposal of the overflow water, we have provided the receptacle with an overflow lip 33 at one end thereof. Associated with the lip 33 for receiving overflow water therefrom is a drain member 34. The drain member 34 may conduct the overflow water to either a sewage connection beneath the refrigerator or to automatic disposal means in the machinery compartment 9 of the refrigerator.

The periodic refilling of the receptacle 12 may be accomplished in any one of several manners. For instance, a plumbing connection could be made with the house water system and an automatically operated valve could be provided for periodically permitting water to flow into the receptacle 12. We prefer, however, to utilize the water resulting from defrosting of the cooling unit 8 for refilling the receptacle 12. Therefore, we have provided a drain pan 35 supported just beneath the cooling unit 8 and inclined downwardly toward the back wall of the liner 3. The drain pan 35 catches and directs water resulting from defrosting of the cooling unit 8 toward the back wall of the liner. Supported on the back wall of the liner beneath the rear edge of the drain pan 35 for catching the defrost moisture is an inclined trough 36. The trough 36 directs the water to the upper end of another inclined trough 37 suitably secured to the side wall of the liner 3. The trough 37 directs the water into the receptacle 12. The capacity of the receptacle 12 is less than the amount of water normally resulting from a defrosting operation. As a result, each defrosting operation results in refilling of the receptacle 12 to overflowing. Thus, the water supply 13 is replenished and stagnation of water in the receptacle 12 is avoided.

In Fig. 6 is shown a second embodiment of our invention in which heat emanating from the refrigerating unit 10 in the machinery compartment 9 of the refrigerator 1 is utilized for increasing the humidity in the food storage compartment 4. In this form, water resulting from defrosting of the cooling unit 8 is conducted by an inclined drain pan 38 to the back wall of the liner 3. The water runs down the back wall of the liner 3 and is directed by a chute member 39 into a receptacle 40 resting on the bottom of the food storage compartment 4. Thus, the receptacle 40 is provided with a supply of water indicated by 41. The receptacle 40 is also provided with an overflow lip 42 associated with a drain member 43 for directing overflow water into the machinery compartment 9 for disposal. The receptacle 40 is similar to the receptacle 12 described above in that it, too, is of less capacity than the amount of water normally resulting from each defrosting operation of the cooling unit 8. Consequently, each defrosting operation results in a replenishment of the water supply 41 and overflowing of the receptacle 40 for preventing stagnation of water therein. In this form of our invention the receptacle 40, in resting on the bottom of the food storage compartment 4, is disposed directly over the refrigerating unit 10 located in the machinery compartment 9 beneath the food storage compartment. The water supply 41 is heated by the heat emanating from the refrigerating unit 9 and leaking into the food storage compartment 4 through the bottom thereof. Thus, the water supply 41 is heated for effecting evaporation of a portion thereof into the food storage compartment 4 for maintaining a satisfactory degree of humidity therein.

In Fig. 7 is illustrated a third embodiment of our invention in which heat from the air in the room containing the refrigerator 1 is utilized for increasing the humidity in the food storage compartment 4 of the refrigerator. Fig. 7 shows in detail the construction of the refrigerator cabinet at the access opening to the food storage compartment 4. The heat insulative breaker strip 5, as pointed out above, closes the space between the edges of the outer case 2 and the liner 3. Additionally, the breaker strip 5 minimizes heat transfer from the outer case 2, which is formed of a high heat conductive material and, therefore, is warmed by room air, to the cooler liner 3. Passing through the breaker strip 5 and thereby insulated from the liner 3 is an element or strap 44 formed of aluminum or any other high heat conductive material. One end of the strap 44 is secured, as by welding, to the outer case 2. The other end of the strap 44 is disposed in the food storage compartment 4 and is similarly secured to a receptacle 45 also formed of a high heat conductive material such as aluminum. In this arrangement, the strap 44 provides a heat path from the outer case warmed by room air to the relatively cooler receptacle 45. In this manner the receptacle 45 and a supply of water contained therein and indicated by 46 is heated for effecting evaporation of a portion of the water thereby to increase the humidity in the food storage compartment 4. Thus, room heat its utilized in maintaining a satisfactory degree of humidity in the food storage compartment. In a manner similar to that shown in either Fig. 1 or Fig. 6, periodic defrosting of the cooling unit 8 may be employed for replenishing the water supply 46 and for preventing stagnation of water in the receptacle 45 of the present form of our invention.

While we have shown and described specific embodiments of our invention, we do not desire our invention to be limited to particular forms shown and described and we intend by the appended claims to cover all modifications within the spirit and scope of our invention.

What we claim as new and desire to secure by Letters Patent of the United States is:

1. In a refrigerator, a food storage compartment, a butter conditioner cooled by air from said food storage compartment, said butter conditioner including a heating element and thermostatic means responsive to the temperature of the air entering said butter conditioner from said food storage compartment, said thermostatic means being effective when said temperature of said air from said food storage compartment decreases below a predetermined minimum for energizing said heating element thereby to increase the temperature of air in said butter conditioner, a receptacle disposed in said food storage compartment, said receptacle containing a supply of water, and a second heating element further contained by said receptacle, said second heating element being controlled by said thermostatic means in said butter conditioner and also energized when the temperature of air from said storage compartment decreases below said predetermined minimum for evaporating said supply of water thereby to maintain a satisfactory degree of humidity in said food storage compartment.

2. In a refrigerator, a food storage compartment, and a cooling unit in said food storage compartment, a refrigerating unit adapted for supplying refrigerant to said cooling unit when energized, temperature responsive means for energizing said refrigerating unit when said cooling unit attains a predetermined maximum temperature, a receptacle disposed in said food storage compartment, said receptacle containing a supply of water, and a heating element further contained by said receptacle, said heating element also being controlled by said temperature responsive means, said heating element being energized for evaporating said water only when said refrigerating unit is idle thereby to maintain a satisfactory degree of humidity in said food storage compartment.

References Cited in the file of this patent

UNITED STATES PATENTS

| | | |
|---|---|---|
| 2,031,550 | Smilack | Feb. 18, 1936 |
| 2,089,953 | Gaugler | Aug. 17, 1937 |
| 2,090,413 | Gould | Aug. 17, 1937 |
| 2,090,416 | Hull | Aug. 17, 1937 |
| 2,152,157 | Sittler | Mar. 28, 1939 |
| 2,681,550 | McCloy | June 20, 1954 |